United States Patent
Nako et al.

(10) Patent No.: US 9,505,087 B2
(45) Date of Patent: Nov. 29, 2016

(54) WELD METAL HAVING EXCELLENT TEMPER EMBRITTLEMENT RESISTANCE

(71) Applicant: Kobe Steel, Ltd., Kobe-shi (JP)

(72) Inventors: Hidenori Nako, Kobe (JP); Ken Yamashita, Fujisawa (JP); Minoru Otsu, Fujisawa (JP); Genichi Taniguchi, Fujisawa (JP); Mikihiro Sakata, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 293 days.

(21) Appl. No.: 14/350,985

(22) PCT Filed: Nov. 21, 2012

(86) PCT No.: PCT/JP2012/080170
§ 371 (c)(1),
(2) Date: Apr. 10, 2014

(87) PCT Pub. No.: WO2013/077356
PCT Pub. Date: May 30, 2013

(65) Prior Publication Data
US 2014/0294491 A1    Oct. 2, 2014

(30) Foreign Application Priority Data

Nov. 21, 2011 (JP) ................................ 2011-254318
Feb. 23, 2012 (JP) ................................ 2012-037810

(51) Int. Cl.
*C22C 38/22* (2006.01)
*C22C 38/24* (2006.01)
(Continued)

(52) U.S. Cl.
CPC ............. *B23K 35/3086* (2013.01); *B23K 9/23* (2013.01); *B23K 35/0261* (2013.01); *B23K 35/0266* (2013.01); *B23K 35/30* (2013.01); *B23K 35/308* (2013.01); *B23K 35/3053* (2013.01); *B23K 35/3093* (2013.01); *B23K 35/3602* (2013.01); *B23K 35/365* (2013.01); *C21D 9/50* (2013.01);
(Continued)

(58) Field of Classification Search
None
See application file for complete search history.

(56) References Cited

U.S. PATENT DOCUMENTS

| 4,994,647 A | 2/1991 | Tanaka et al. |
| 5,430,269 A | 7/1995 | Natsume et al. |
| 2008/0199346 A1 | 8/2008 | Okazaki et al. |

FOREIGN PATENT DOCUMENTS

| EP | 1 693 143 A1 | 8/2006 |
| EP | 1 958 729 A1 | 8/2008 |

(Continued)

OTHER PUBLICATIONS

Machine-English translation of Japanese patent publication No. 2009-106949, Okazaki Yoshiomi et al., Oct. 26, 2007.*

(Continued)

*Primary Examiner* — Deborah Yee
(74) *Attorney, Agent, or Firm* — Oblon, McClelland, Maier & Neustadt, L.L.P.

(57) ABSTRACT

A weld metal according to the present invention has a specific chemical composition, contains carbide particles each having an equivalent circle diameter of greater than 0.5 μm in a number of 0.25 or less per micrometer of grain boundary length, and has an A-value as specified by Formula (1) of 0.12 or more, Formula (1) expressed as follows:

$$A\text{-value}=([V]/51+[Nb]/93)/([Cr]/52+[Mo]/96) \qquad (1)$$

where [V], [Nb], [Cr], and [Mo] are contents (percent by mass) of V, Nb, Cr, and Mo, respectively, in the weld metal.

12 Claims, 5 Drawing Sheets

(IN mm)

(51) Int. Cl.
    *C22C 38/26*     (2006.01)
    *B23K 35/22*     (2006.01)
    *B23K 35/30*     (2006.01)
    *B23K 9/23*     (2006.01)
    *C22C 38/54*     (2006.01)
    *C22C 38/00*     (2006.01)
    *C22C 38/02*     (2006.01)
    *C22C 38/04*     (2006.01)
    *C22C 38/06*     (2006.01)
    *C22C 38/20*     (2006.01)
    *C22C 38/32*     (2006.01)
    *C22C 38/34*     (2006.01)
    *C22C 38/38*     (2006.01)
    *C22C 38/42*     (2006.01)
    *C22C 38/44*     (2006.01)
    *C22C 38/46*     (2006.01)
    *C22C 38/48*     (2006.01)
    *B23K 35/365*     (2006.01)
    *C21D 9/50*     (2006.01)
    *B23K 35/36*     (2006.01)
    *C22C 38/50*     (2006.01)
    *B23K 35/02*     (2006.01)

(52) U.S. Cl.
    CPC ........... *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/32* (2013.01); *C22C 38/34* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *B23K 2203/04* (2013.01); *Y10T 403/478* (2015.01)

(56) References Cited

FOREIGN PATENT DOCUMENTS

| | | |
|---|---|---|
| EP | 2 674 241 A1 | 12/2013 |
| EP | 2 684 638 A1 | 1/2014 |
| EP | 2 695 702 A1 | 2/2014 |
| JP | 2 182378 | 7/1990 |
| JP | 2 220797 | 9/1990 |
| JP | 6 328292 | 11/1994 |
| JP | 8 150478 | 6/1996 |
| JP | 10 137975 | 5/1998 |
| JP | 2000 301378 | 10/2000 |
| JP | 2002 263883 | 9/2002 |
| JP | 2008 229718 | 10/2008 |
| JP | 2009 106949 | 5/2009 |
| KR | 10-2008-0077335 | 8/2008 |
| WO | 2012 108517 | 8/2012 |
| WO | 2012 124529 | 9/2012 |

OTHER PUBLICATIONS

Extended European Search Report issued Feb. 10, 2015 in Patent Application No. 12851882.6.

International Search Report Issued Feb. 5, 2013 in PCT/JP12/080170 Filed Nov. 21, 2012.

Written Opinion of the International Searching Authority Issued Feb. 5, 2013 in PCT/JP12/080170 Filed Nov. 21, 2012.

\* cited by examiner

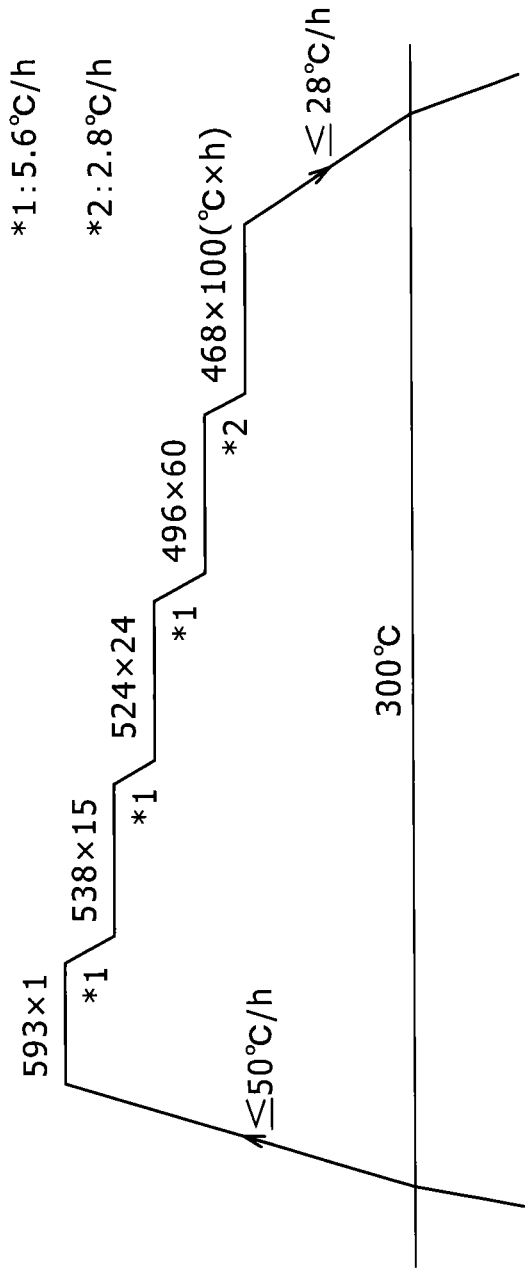

CARBIDE (GRAY) WITH EQUIVALENT CIRCLE DIAMETER OF 0.4 μm OR LESS

CARBIDE (BLACK) WITH EQUIVALENT CIRCLE DIAMETER OF GREATER THAN 0.4 μm

NO STRAIGHT LINE IS DRAWN WHEN IT INTERSECTS LESS THAN THREE CARBIDES WITH AN EQUIVALENT CIRCLE DIAMETER OF GREATER THAN 0.4 μm

※STRAIGHT LINES A1 TO A8 EACH HAVE A LENGTH OF 6 μm (IN mm)

T:THICKNESS

WELD METAL HAVING EXCELLENT TEMPER EMBRITTLEMENT RESISTANCE

TECHNICAL FIELD

The present invention generally relates to weld metals for use in welding of high-strength steels such as Cr—Mo steels. Specifically, it relates to a weld metal having better temper embrittlement resistance; and a welded structure including the weld metal.

BACKGROUND ART

High-strength Cr—Mo steels and weld beads (weld metals) thereof for use in steam boilers and chemical reactors are exposed to a high-temperature and high-pressure environment during use. They require not only basic properties such as strength and toughness, but also heat resistance (high-temperature strength), stress-relief cracking resistance [resistance to intergranular cracking during a stress-relief heat treatment (SR heat treatment)], and temper embrittlement resistance (resistance to embrittlement during use in a high-temperature environment) at high levels. Recent apparatuses have larger sizes and larger wall thicknesses. Welding on these large-sized apparatuses has been performed with an increasing heat input for better operation efficiency. Such increasing welding heat input will generally cause weld beads to have a coarsened microstructure and inferior toughness (inferior temper embrittlement resistance). To prevent this, weld metals of high-strength Cr—Mo steels require toughness and temper embrittlement resistance at further higher levels.

Various techniques have been proposed while focusing attention on toughness and temper embrittlement resistance of weld metals formed upon welding of high-strength Cr—Mo steels.

Typically, Patent literature (PTL) 1 discloses a technique relating to a weld metal having various properties at certain levels. The weld metal is obtained by minutely specifying chemical compositions of a base steel sheet and a welding material (welding consumable), and welding conditions. Some working examples according to this technique, however, have unsatisfactory toughness after a temper embrittling treatment (step cooling) in terms of $vTr'_{5.5}$ of at best −41° C., although having satisfactory toughness after a stress relief heat treatment (SR heat treatment) in terms of $vTr_{5.5}$ of −50° C. The term "$vTr'_{5.5}$" refers to a temperature at which a sample after the step cooling has an absorbed energy of 5.5 kgf·m. The term "$vTr_{5.5}$" refers to a temperature at which a sample after the SR heat treatment has an absorbed energy of 5.5 kgf·m.

PTL 2 proposes a technique relating to a coated electrode including a core wire and a coating flux. The technique relationally specifies contents of C, Mn, and Ni while maintaining yields of the core wire and the coating at certain levels so as to improve toughness, strength, and heat resistance. The technique, however, fails to give consideration to temper embrittlement resistance.

Independently, to provide weld metals that excel in toughness, strength, temper embrittlement resistance, and stress-relief cracking resistance, PTL 3 and PTL 4, for example, propose techniques of specifying chemical compositions of solid wires and bonded fluxes, and welding conditions (heat input). Some working examples according to these techniques have satisfactory toughness both after an SR heat treatment and after a temper embrittling treatment (step cooling). Specifically, they have a $vTr_{55}$ and a $vTr'_{55}$ of each lower than −50° C. The $vTr55$ indicates toughness of a sample after an SR heat treatment and refers to a temperature at which the sample after the SR treatment has an absorbed energy of 55 J. The $vTr'_{55}$ indicates toughness of a sample after a temper embrittling treatment (step cooling) and refers to a temperature at which the sample after the step cooling has an absorbed energy of 55 J. The working examples, however, each have a difference $\Delta vTr_{55}$ ($=vTr'_{55}-vTr_{55}$) of 8° C. or greater. This indicates that the techniques fail to sufficiently suppress temper embrittlement.

PTL 5 proposes a technique of controlling a chemical composition, particularly amounts of impurity elements, of a weld metal to help the weld metal to have better toughness, strength, and stress-relief cracking resistance. The technique, however, fails to give consideration to temper embrittlement resistance.

PTL 6 proposes a technique of controlling chemical compositions of a core wire and a coating flux of a welding electrode for use in shielded metal arc welding so as to give a weld metal having better toughness and higher strength. The technique, however, fails to give consideration to temper embrittlement resistance. In addition, the technique is significantly limited in operation because a designed welding heat input is small.

PTL 7 and PTL 8, for example, propose techniques of controlling chemical compositions of a core wire and a coating flux of a welding electrode for use in shielded metal arc welding so as to give weld metals having better toughness and higher strength. Weld metals according to the techniques have toughness and temper embrittlement resistance both at high levels. In view of recommended welding conditions, however, the techniques fail to sufficiently support increase in welding heat inputs. This is because the technique disclosed in PTL 7 specifies a weld metal in shielded metal arc welding and recommends a welding current of from about 140 to about 190 A (at a core wire diameter φ of 4.0 mm); and the technique disclosed in PTL 8 specifies a weld metal in submerged arc welding and recommends a heat input of from about 2.0 to about 3.6 kJ/mm.

CITATION LIST

Patent Literature

PTL 1: Japanese Unexamined Patent Application Publication (JP-A) No. H02-182378
PTL 2: JP-A No. H02-220797
PTL 3: JP-A No. H06-328292
PTL 4: JP-A No. H08-150478
PTL 5: JP-A No. 2000-301378
PTL 6: JP-A No. 2002-263883
PTL 7: JP-A No. 2008-229718
PTL 8: JP-A No. 2009-106949

SUMMARY OF INVENTION

Technical Problem

Under these circumstances, an object of the present invention is to provide a weld metal which exhibits satisfactory temper embrittlement resistance and excels in properties such as toughness, stress-relief cracking resistance, and strength even under welding conditions with a relatively high heat input. Another object of the present invention is to provide a welded structure including the weld metal.

Solution to Problem

The present invention achieves the objects and provides a weld metal. The weld metal contains C in a content of from 0.05% to 0.15%; Si in a content of from 0.1% to 0.50%; Mn in a content of from 0.60% to 1.30%; Cr in a content of from 1.80% to 3.0%; Mo in a content of from 0.80% to 1.20%; V in a content of from 0.25% to 0.50%; Nb in a content of from 0.010% to 0.050%; N in a content of from greater than 0% to 0.025%; and O in a content of from 0.020% to 0.060%, in mass percent, with the remainder including iron and inevitable impurities. The weld metal includes carbide particles each having an equivalent circle diameter of greater than 0.5 μm in a number of 0.25 or less per micrometer of grain boundary length, and has an A-value as specified by Formula (1) of 0.12 or more, where Formula (1) is expressed as follows:

$$A\text{-value}=([V]/51+[Nb]/93)/([Cr]/52+[Mo]/96) \quad (1)$$

where [V], [Nb], [Cr], and [Mo] are contents (in percent by mass) of V, Nb, Cr, and Mo, respectively, in the weld metal.

The weld metal preferably has a number density of oxide particles each having an equivalent circle diameter of greater than 2 μm of 100 or less per square millimeter.

As used herein the term "equivalent circle diameter" refers to a diameter of an assumed circle having an equivalent area to the size (area) of a carbide particle or an oxide particle observed on an observation plane under a microscope (e.g., a transmission electron microscope).

In preferred embodiments, the weld metal according to the present invention may further contain one or more of additional elements such as (a) Cu in a content of from greater than 0% to 1.0% and/or Ni in a content of from greater than 0% to 1.0%; (b) B in a content of from greater than 0% to 0.0050%; (c) W in a content of from greater than 0% to 0.50%; (d) Al in a content of from greater than 0% to 0.030%; and (e) Ti in a content of from greater than 0% to 0.020%. The resulting weld metal can have further better property or properties according to the type(s) of element(s) to be contained.

The present invention also includes a welded structure including the weld metal as above.

Advantageous Effects Of Invention

The present invention specifies the chemical composition of a weld metal and the number of carbide particles having a predetermined size and being present at grain boundaries in the weld metal. The resulting weld metal exhibits excellent temper embrittlement resistance and excels in properties such as toughness, stress-relief cracking resistance, and strength In a preferred embodiment of the present invention, coarse oxide particles are suppressed, and this helps a weld metal according to the present invention (i.e., a weld metal after an SR heat treatment) to have further better toughness and, even after subjected to a temper embrittling treatment, to exhibit further better toughness.

BRIEF DESCRIPTION OF DRAWINGS

FIG. 1 is a graph illustrating conditions for a step cooling treatment.

DESCRIPTION OF EMBODIMENTS

Figure 2A:
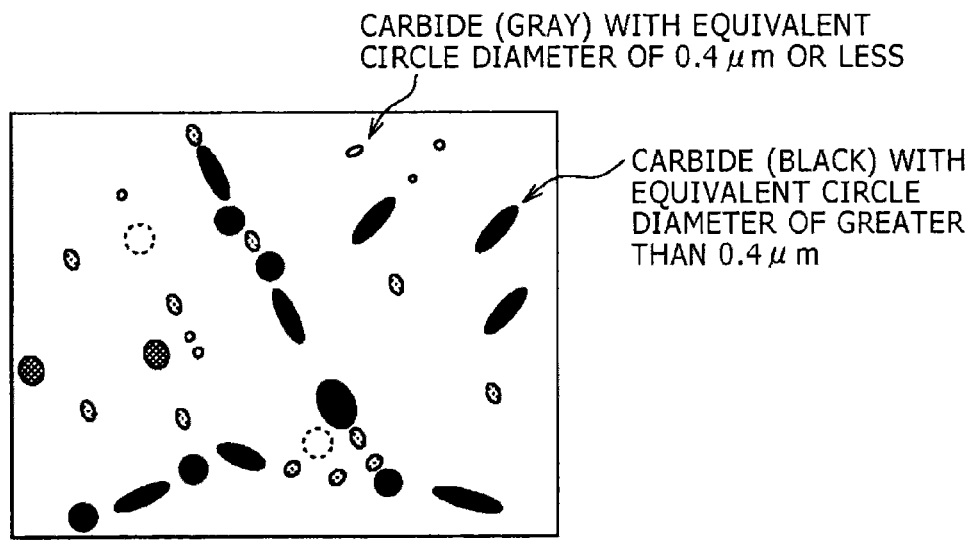
FIG. 2A is a first conceptual diagram illustrating how to calculate the number of grain boundary carbides.

The present inventors made various investigations to provide a weld metal which exhibits excellent temper embrittlement resistance even under welding conditions with a relatively large heat input and which excels in properties such as toughness, stress-relief cracking resistance, and strength. As a result, the present inventors have found that a weld metal can have all these properties by controlling the chemical composition of the weld metal and by specifying the number of carbide particles that are formed during welding and during an SR treatment, are present at grain boundaries of the weld metal, and each have a predetermined size. These carbide particles are hereinafter also referred to as "grain boundary carbides". The present invention has been made based on these findings.

Specifically, the present inventors have found that a weld metal according to the present invention can have the properties such as toughness and temper embrittlement resistance at satisfactory levels by suitably controlling the chemical composition of the weld metal; controlling an A-value as specified by Formula (1) to 0.12 or more; and controlling the number of carbide particles each having an equivalent circle diameter of greater than 0.5 μm contained in the weld metal to 0.25 or less per micrometer, where Formula (1) is expressed as follows:

$$A\text{-value}=([V]/51+[Nb]/93)/([Cr]/52+[Mo]/96) \quad (1)$$

where [V], [Nb], [Cr], and [Mo] are contents (in percent by mass) of V, Nb, Cr, and Mo, respectively, in the weld metal.

The temper embrittlement resistance of a weld metal is evaluated by subjecting the weld metal to an SR heat treatment and then to a heat treatment called step cooling; and determining, as an index for temper embrittlement resistance, how much the toughness deteriorates as compared to a weld metal subjected to a regular SR heat treatment without step cooling. The present inventors have newly found that grain boundary carbides coarsen during the step cooling to cause toughness deterioration. Based on this finding, the present invention can provide a weld metal which less suffers from coarsening of grain boundary carbides and less suffers from toughness deterioration after the step cooling, namely, has excellent temper embrittlement resistance. This is achieved by reducing carbide particles each having an equivalent circle diameter of greater than 0.5 μm and controlling the A-value specified by Formula (1).

The A-value specified by Formula (1) is a parameter for controlling coarsening behavior of grain boundary carbides during the step cooling. The grain boundary carbides are exemplified by $M_{23}C_6$ carbides and $M_6C$ carbides (where M is a carbide-forming element) each mainly containing Cr and/or Mo; and MC carbides each mainly containing Nb and/or V. Among them, in general, $M_{23}C_6$ carbides and $M_6C$ carbides readily coarsen; whereas MC carbides remain fine. This indicates that it is desirable to employ Cr and Mo in lower contents and Nb and V in higher contents so as to suppress coarsening of carbide particles present at grain boundaries. From this viewpoint, the weld metal desirably has an A-value of 0.12 or more. A weld metal having an A-value of less than 0.12 may have inferior temper embrittlement resistance due to larger amounts of coarse grain boundary carbides as precipitated. The weld metal has an A-value of preferably 0.13 or more, more preferably 0.14 or more, and furthermore preferably 0.15 or more. The weld metal, if having an excessively high A-value, may suffer from significantly large amounts of remarkably fine MC carbide particles formed during the SR heat treatment, and this may adversely affect the stress-relief cracking resistance. To prevent this, the weld metal preferably has an A-value of 0.20 or less.

The weld metal according to the present invention is controlled to have a number of carbide particles each having an equivalent circle diameter of greater than 0.5 μm of 0.25 or less per micrometer of grain boundary length. During step cooling, of grain boundary carbides inherently existing, those having relatively large sizes further grow, and this causes coarsening of carbides to proceed. Accordingly, such grain boundary carbides inherently existing and having large sizes should be reduced so as to suppress embrittlement (toughness deterioration) during the step cooling. The number of carbide particles each having an equivalent circle diameter of greater than 0.5 μm is reduced to 0.25 or less per micrometer of grain boundary length. A weld metal including carbide particles in a number higher than the upper limit may fail to have good toughness surely. The number of carbide particles each having an equivalent circle diameter of greater than 0.5 μm is preferably 0.23 or less per micrometer, and more preferably 0.21 or less per micrometer.

In a preferred embodiment, the weld metal according to the present invention has a number density of oxide particles each having an equivalent circle diameter of greater than 2 μm of 100 or less per square millimeter. Such coarse oxide particles each having an equivalent circle diameter of greater than 2 μm act as brittle fracture origins and cause the weld metal to have inferior toughness. The weld metal, when having a number density of oxide particles each having an equivalent circle diameter of greater than 2 μm of 100 or less per square millimeter, can have good toughness after an SR heat treatment and thereby have good toughness after a step cooling. The number density of oxide particles each having an equivalent circle diameter of greater than 2 μm is more preferably 60 or less per square millimeter, and furthermore preferably 40 or less per square millimeter.

The weld metal according to the present invention is also importantly controlled in its chemical composition. Reasons for specifying ranges of the chemical composition are as follows.

C in a Content of from 0.05% to 0.15%

Carbon (C) element is necessary for allowing the weld metal to have a strength at certain level. A weld metal having a C content of less than 0.05% may fail to have a predetermined strength. However, a weld metal having an excessively high C content may have inferior toughness due to coarsening of carbide particles. To avoid this, the C content is controlled to 0.15% or less. The C content is preferably 0.07% or more, and more preferably 0.09% or more in terms of its lower limit; and is preferably 0.13% or less, and more preferably 0.12% or less in terms of its upper limit.

Si in a Content of from 0.1% to 0.50%

Silicon (Si) element effectively helps the weld metal to have good welding workability (weldability). A weld metal having an Si content of less than 0.1% may have inferior weldability. However, a weld metal having an excessively high Si content may suffer from an excessively increased strength or increased amounts of hard phases such as martensite and thereby have inferior toughness. To prevent this, the Si content is controlled to 0.50% or less. The Si content is preferably 0.15% or more, and more preferably 0.17% or more in terms of its lower limit; and is preferably 0.40% or less, and more preferably 0.32% or less in terms of its upper limit.

Mn in a Content of from 0.60% to 1.30%

Manganese (Mn) element effectively helps the weld metal to have a certain strength A weld metal having an Mn content of less than 0.60% may have a lower strength at room temperature and may suffer from inferior stress-relief cracking resistance However, a weld metal having an excessively high Mn content may suffer from deterioration in temper embrittlement resistance. To prevent this, the Mn content is controlled to 1.30% or less. The Mn content is preferably 0.8% or more, and more preferably 0.9% or more in terms of its lower limit; and is preferably 1.2% or less, and more preferably 1.15% or less in terms of its upper limit.

Cr in a Content of from 1.80% to 3.0%

A weld metal having a Cr content of less than 1.80% may suffer from inferior stress-relief cracking resistance due to the precipitation of film-like coarse cementite particles at prior austenite grain boundaries. However, a weld metal having an excessively high Cr content may cause carbide particles to coarsen and thereby cause the weld metal to have inferior toughness. To prevent this, the Cr content is controlled to 3.0% or less. The Cr content is preferably 1.9% or more, and more preferably 2.0% or more in terms of its lower limit; and is preferably 2.8% or less, and more preferably 2.6% or less in term of its upper limit.

Mo in a Content of from 0.80% to 1.20%

Molybdenum (Mo) element usefully helps the weld metal to have a certain strength A weld metal having an Mo content of less than 0.80% may fail to have a predetermined strength. However, a weld metal having an excessively high Mo content may have inferior toughness due to an excessively increased strength and may include an increased amount of solute molybdenum after an SR heat treatment. This may cause precipitation of fine $Mo_2C$ carbide particles during a step cooling and may cause the weld metal to have inferior temper embrittlement resistance. To prevent this, the Mo content is controlled to 1.20% or less. The Mo content is preferably 0.9% or more, and more preferably 0.95% or more in terms of its lower limit; and is preferably 1.15% or less, and more preferably 1.1% or less in terms of its upper limit.

V in a Content of from 0.25% to 0.50%

Vanadium (V) element forms carbide particles (MC carbide particles where M is a carbide-forming element) and usefully helps the weld metal to have a certain strength A weld metal having a V content of less than 0.25% may fail to have a predetermined strength. However, a weld metal having an excessively high V content may suffer from inferior toughness due to an excessively increased strength. To prevent this, the V content is controlled to 0.50% or less. The V content is preferably 0.27% or more, and more preferably 0.30% or more in terms of its lower limit; and is preferably 0.45% or less, and more preferably 0.40% or less in terms of its upper limit.

Nb in a Content of from 0.010% to 0.050%

Niobium (Nb) element forms carbides (MC carbides) and usefully helps the weld metal to have a certain strength A weld metal having an Nb content of less than 0.010% may fail to have a predetermined strength. However, a weld metal having an excessively high Nb content may have inferior toughness due to an excessively increased strength. To prevent this, the Nb content is controlled to 0.050% or less. The Nb content is preferably 0.012% or more, and more preferably 0.015% or more in terms of its lower limit; and is preferably 0.040% or less, and more preferably 0.035% or less in terms of its upper limit.

N in a Content of from Greater than 0% to 0.025%

Nitrogen (N) element usefully helps the weld metal to have a certain creep strength. However, a weld metal having an excessively high N content may have inferior toughness due to an excessively increased strength. To prevent this, the N content is controlled to 0.025% or less. To exhibit these effects, the N content is preferably 0.004% or more, and more preferably 0.005% or more in terms of its lower limit; and is preferably 0.020% or less, and more preferably 0.018% or less in terms of its upper limit.

O in a Content of from 0.020% to 0.060%

Oxygen (O) element forms oxides, contributes to microstructure refinement, and usefully helps the weld metal to have better toughness. To exhibit such effects, the O content should be 0.020% or more. However, a weld metal having an excessively high O content of greater than 0.060% may suffer from increased amounts of coarse oxide particles acting as brittle fracture origins and have inferior toughness contrarily. The O content is preferably 0.025% or more, and more preferably 0.028% or more in terms of its lower limit; and is preferably 0.050% or less, and more preferably 0.045% or less in terms of its upper limit.

The weld metal according to the present invention contains elements as specified above, with the remainder including iron and inevitable impurities. As the inevitable impurities, the weld metal may contain elements (e.g., P and S) as incorporated into the weld metal from surroundings and resources such as raw materials, facility materials, and manufacturing equipment.

In preferred embodiments, the weld metal according to the present invention further contains one or more additional elements such as (a) Cu in a content of from greater than 0% to 1.0% and/or Ni in a content of from greater than 0% to 1.0%; (b) B in a content of from greater than 0% to 0.0050%; (c) W in a content of from greater than 0% to 0.50%; (d) Al in a content of from greater than 0% to 0.030%; and (e) Ti in a content of from greater than 0% to 0.020%. The weld metal can have further better property or properties according to the type of an element or elements to be contained. Reasons for specifying the contents of these elements to be contained are as follows.

Cu in a Content of from Greater than 0% to 1.0% and/or Ni in a Content of from Greater than 0% to 1.0%

Copper (Cu) and nickel (Ni) elements contribute to microstructure refinement and thereby effectively help the weld metal to have better toughness. However, a weld metal having excessively high contents of these elements may suffer from inferior toughness contrarily due to an excessively increased strength. To prevent this, the Cu and Ni contents are each preferably 1.0% or less, more preferably 0.8% or less, and furthermore preferably 0.5% or less. To exhibit the above-mentioned effects, the Cu and Ni contents are each preferably 0.05% or more, and more preferably 0.1% or more in terms of their lower limit.

B in a Content of from Greater than 0% to 0.0050%

Boron (B) element suppresses the formation of ferrite at grain boundaries and effectively helps the weld metal to have a higher strength. However, a weld metal having an excessively high B content may suffer from inferior stress-relief cracking resistance. To prevent this, the B content is controlled to preferably 0.0050% or less, more preferably 0.0040% or less, and furthermore preferably 0.0025% or less. To exhibit the above-mentioned effects, the B content is preferably 0.0005% or more, and more preferably 0.0010% or more in terms of its lower limit.

W in a Content of from Greater than 0% to 0.50%

Tungsten (W) element effectively helps the weld metal to have a higher strength. However, a weld metal having an excessively high W content may suffer from deterioration in toughness due to coarsening of carbide particles precipitated at grain boundaries. To prevent this, the W content is preferably controlled to 0.50% or less, more preferably 0.3% or less, and furthermore preferably 0.2% or less. To exhibit the above-mentioned effects, the W content is preferably 0.08% or more, and more preferably 0.1% or more in terms of its lower limit.

Al in a Content of from Greater than 0% to 0.030%

Aluminum (Al) element effectively acts as a deoxidizer. However, a weld metal having an excessively high Al content may cause oxide particles to coarsen and suffer from deterioration in toughness. To prevent this, the Al content is preferably controlled to 0.030% or less, more preferably 0.020% or less, and furthermore preferably 0.015% or less. To exhibit the above-mentioned effects, the Al content is preferably 0.001% or more, and more preferably 0.0012% or more in terms of its lower limit.

Ti in a Content of from Greater than 0% to 0.020%

Titanium (Ti) element effectively helps the weld metal to have a higher strength. However, Ti, if contained in excess, may accelerate precipitation hardening by MC carbides, thereby significantly increase intragranular hardening, and cause the weld metal to have inferior stress-relief cracking resistance. To prevent this, the Ti content is preferably controlled to 0.020% or less, more preferably 0.015% or less, and furthermore preferably 0.012% or less. To exhibit the above-mentioned effects, the Ti content is preferably 0.005% or more, and more preferably 0.008% or more in terms of its lower limit.

A welding method to give the weld metal according to the present invention may employ any technique, as long as being an arc welding technique, but preferably employs shielded metal arc welding (SMAW) that is frequently used in actual welding operation typically of chemical reactors.

To provide the weld metal according to the present invention, however, a welding consumable and welding conditions should be suitably controlled. The chemical composition of the welding consumable is naturally limited by the required chemical composition of the weld metal. In addition, the welding conditions and welding consumable chemical composition should be suitably controlled so as to give predetermined dimensions of carbide particles.

Typically when employing SMAW, welding is preferably performed under such conditions that a welding heat input is 3.0 kJ/mm or less and a preheat-interpass temperature in welding is 250° C. or lower. To give a predetermined weld metal under these welding conditions, a welding electrode (welding rod) including a core wire and a coating flux may be manufactured in the following manner. The core wire is desirably designed to have an Mo content of 1.20% or less (preferably 1.1% or less, and more preferably 1.0% or less) and a Cr content of 2.30% or less (preferably 2.28% or less, and more preferably 2.26% or less). The coating flux is desirably designed to have an $Si/SiO_2$ ratio of 1.0 or more (preferably 1.1 or more, and more preferably 1.2 or more) and an Mo content of 1.2% or less (preferably 1.1% or less, and more preferably 1.0% or less).

The core wire, if having an Mo content and a Cr content of higher than the preferred ranges, and the coating flux, if having an Mo content of higher than the preferred range, may cause the formation of grain boundary carbides during a cooling process in welding, which grain boundary carbides act as nuclei to form $M_{23}C_6$ carbides and $M_6C$ carbides. This may cause the weld metal to include large-sized grain boundary carbides in a number of larger than the predetermined level. Among the carbides, $M_6C$ carbides readily coarsen. To prevent this, Mo acting as a main constitutive element of the $M_6C$ carbides should be strictly controlled. The coating flux, if having an $Si/SiO_2$ ratio of less than 1.0, may cause reduction in solute Si in the weld metal, which solute Si suppresses cementite formation. As a result, cementite may be formed at grain boundaries during the cooling process in welding, and this may cause the weld metal to include large-sized grain boundary carbides in a number larger than the predetermined level, as in the above case.

To allow the weld metal to have a number density of coarse oxide particles (having an equivalent circle diameter of greater than 2 μm) of 100 or less per square millimeter, the coating flux preferably has an MgO content of 2.0% or more. MgO in the coating flux has the activity of preventing coarse oxide particles from forming in the weld metal. While its reason remaining unknown, this is probably because the presence of MgO may change the balance between deoxidizing elements and free elements to thereby accelerate the formation of fine oxide particles. To exhibit such effect, the coating flux has an MgO content of preferably 2.0% or more, more preferably 2.1% or more, and furthermore preferably 2.2% or more. Though not critical, the upper limit of the MgO content in the coating flux is typically about 5.0%.

SMAW, if performed with a heat input of greater than 3.0 kJ/mm or at a preheat-interpass temperature of higher than 250° C., may cause the weld metal to have a coarse weld structure. Thus, grain boundaries acting as nucleation sites for carbide particles are reduced, and this may increase the amounts of large-sized grain boundary carbides. However, SMAW, if performed with an excessively small heat input or at an excessively low preheat-interpass temperature, may cause the weld metal to have an excessively increased strength and to fail to ensure toughness after an SR heat treatment. To prevent this, the heat input and the preheat-interpass temperature are preferably controlled to 2.3 kJ/mm or more and 190° C. or higher, respectively.

A weld metal, when formed under conditions as mentioned above, can exhibit excellent temper embrittlement resistance and can excel in properties such as toughness, stress-relief cracking resistance, and strength. This gives a welded structure including such excellent weld metal.

EXAMPLES

The present invention will be illustrated in further detail with reference to several examples below. It should be noted, however, that the examples are never construed to limit the scope of the invention; that various changes and modifications are possible within purview of the description as described above and below; and that it is intended to cover all such changes and modifications as fall within the true spirit and scope of the invention.

Weld metals were prepared using a base metal having a chemical composition under welding conditions mentioned later, subjected to a heat treatment, and evaluated on various properties.

Base Metal Chemical Composition (Percent by Mass)

C in a content of 0.12%; Si in a content of 0.23%; Mn in a content of 0.48%; P in a content of 0.004%; S in a content of 0.005%; Cu in a content of 0.04%; Al in a content of less than 0.002%; Ni in a content of 0.08%; Cr in a content of 2.25%; Mo in a content of 0.99%; V in a content of 0.004%; Ti in a content of 0.002%; and Nb in a content of 0.005%, with the remainder being iron and inevitable impurities.

Welding Conditions

Welding technique: shielded metal arc welding (SMAW)
Base metal thickness: 20 mm
Groove angle: 20° (V groove)
Root opening: 19 mm
Welding position: flat
Core wire diameter: 5.0 mm in diameter (chemical compositions of coating fluxes are indicated in Tables 1 to 3)
Heat input conditions
(i) 2.3 kJ/mm (215 A and 27 V, 2.5 mm/sec)
(ii) 2.7 kJ/mm (215 A and 27 V, 2.2 mm/sec)
(iii) 3.0 kJ/mm (220 A and 27 V, 2.0 mm/sec)
(iv) 3.2 kJ/mm (225 A and 28 V, 2.0 mm/sec)
Preheat-interpass temperature: from 190° C. to 260° C.
Buildup procedure: two passes per layer (eight layers in total)

Chemical Composition of Used Core Wires

Chemical Composition a (percent by mass): C of 0.07%, Si of 0.13%, Mn of 0.50%, Cu of 0.03%, Ni of 0.02%, Cr of 2.26%, and Mo of 1.03% (with the remainder being iron and inevitable impurities)

Chemical Composition b (percent by mass): C of 0.08%, Si of 0.13%, Mn of 0.48%, Cu of 0.03%, Ni of 0.02%, Cr of 2.29%, and Mo of 1.15% (with the remainder being iron and inevitable impurities)

Chemical Composition c (percent by mass): C of 0.05%, Si of 0.20%, Mn of 0.45%, Cu of 0.04%, Ni of 0.02%, Cr of 1.39%, and Mo of 0.55% (with the remainder being iron and inevitable impurities)

Chemical Composition d (percent by mass): C of 0.09%, Si of 0.15%, Mn of 0.49%, Cu of 0.04%, Ni of 0.03%, Cr of 2.31%, and Mo of 1.10% (with the remainder being iron and inevitable impurities)

Chemical Composition e (percent by mass): C of 0.08%, Si of 0.18%, Mn of 0.50%, Cu of 0.03%, Ni of 0.03%, Cr of 2.28%, and Mo of 1.22% (with the remainder being iron and inevitable impurities)

Heat Treatments

Stress-Relief (SR) Heat Treatment

Each of the above-prepared weld metals was subjected to a heat treatment at 705° C. for 8 hours as an SR heat treatment. In the SR heat treatment, the test sample was heated. At the time when the test sample temperature exceeded 300° C., heating conditions were adjusted so as to give a rate of temperature rise of 55° C. per hour (55° C./hour) or less, and the test sample was then further heated until the test sample temperature reached 705° C. The test sample was held at 705° C. for 8 hours and cooled down to a test sample temperature of 300° C. or lower at a cooling rate of 55° C./hour or less. In the SR heat treatment, the rate of temperature rise and cooling rate in the temperature range of test sample temperatures of 300° C. or lower were not specified.

Step Cooling

The test sample after the SR heat treatment was subjected to step cooling as an embrittlement accelerating treatment. FIG. 1 is a graph illustrating step cooling treatment conditions with the ordinate indicating temperature and the abscissa indicating time. With reference to FIG. 1, the step cooling was performed in the following manner. The test sample was heated, at the time when the test sample temperature exceeded 300° C., the heating conditions were adjusted so as to give a rate of temperature rise of 50° C. per hour (50° C./hour) or less, the temperature was further heated up to a test sample temperature of 593° C., and held at that temperature for one hour. By the same procedure, the test sample was then held at 538° C. for 15 hours, at 524° C. for 24 hours, and at 496° C. for 60 hours. In these cooling steps, conditions were adjusted so that the test sample was cooled at a cooling rate of 5.6° C. per hour. After being held at 496° C., the test sample was cooled at a rate of 2.8° C. per hour (2.8° C./hour) down to 468° C. and held at that temperature for 100 hours. The test sample was then cooled down to a test sample temperature of 300° C. or lower at a rate of temperature fall of 28° C. per hour (28° C./hour) or less. In the step cooling treatment, the rate of temperature rise and cooling rate were not specified in a temperature range of test sample temperatures of 300° C. or lower, as in the SR heat treatment.

Evaluated Properties

Number of Grain Boundary Carbides Having Equivalent Circle Diameter of Greater Than 0.5 μm A specimen for replica TEM observation was sampled from a central part of final pass of each of the above-prepared weld metals after the SR heat treatment at 705° C. for 8 hours, and four images each having a field of view of 13.3 μm by 15.7 μm were taken at 7500-fold magnification. Carbide particles each having an equivalent circle diameter of greater than 0.50 μm were selected using an image analyzing software ("Image-Pro Plus" supplied by Media Cybernetics, Inc.), and the number of carbide particles existing at grain boundaries was calculated. The forms of carbide particles were analyzed in a manner as follows.

Figure 2B:
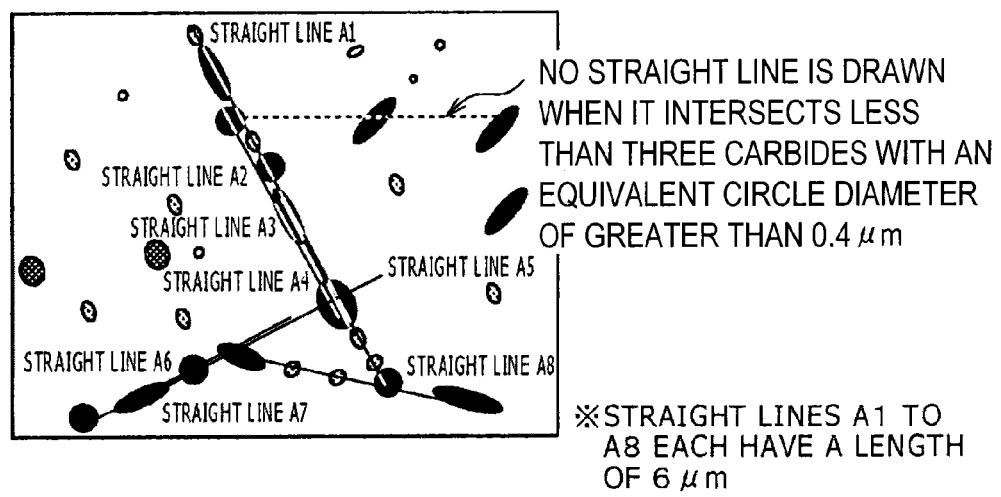
FIG. 2B is a second conceptual diagram illustrating how to calculate the number of grain boundary carbides.

(1) A straight line Ai (i=1, 2, 3. . . n, where n is the total number of straight lines) is drawn so as to have a length of 6 μm and to intersect at least three carbide particles each having an equivalent circle diameter of greater than 0.5 μm (FIGS. 2A and 2B).

Figure 2C:
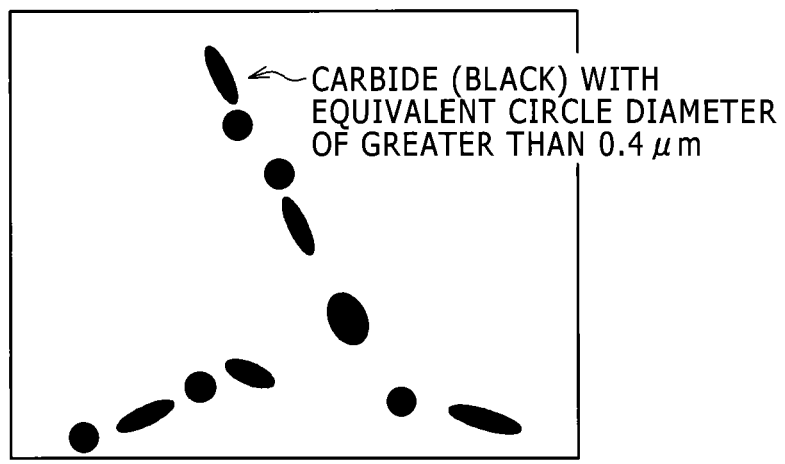
FIG. 2C is a third conceptual diagram illustrating how to calculate the number of grain boundary carbides.

(2) Carbide particles having an equivalent circle diameter of greater than 0.5 μm and intersecting the straight line Ai are selected (FIG. 2C).

Figure 2D:
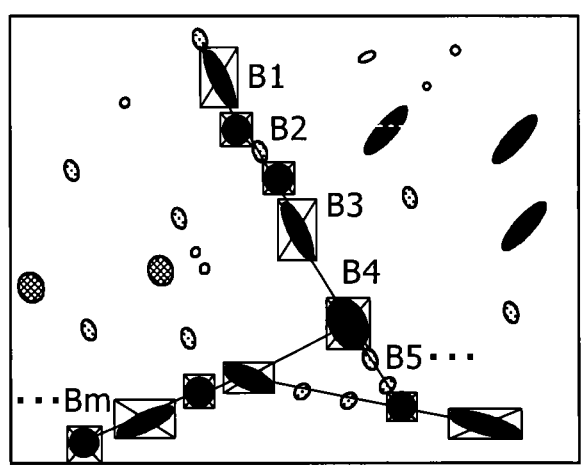
FIG. 2D is a fourth conceptual diagram illustrating how to calculate the number of grain boundary carbides.

(3) Centers of circumscribed quadrangles of carbide particles adjacent on the straight line Ai are connected with a straight line Bi (i=1, 2, 3. . . m, where m is the total number of straight lines) (FIG. 2D); of the carbide particles, the number of carbide particles each having an equivalent circle diameter of greater than 0.5 μm is divided by the total length (in μm) of straight lines B1 to Bm; and the resulting value is defined as a "number of carbide particles, of the carbide particles present at grain boundaries in the weld metal, each having an equivalent circle diameter of greater than 0.5 μm per unit grain boundary (per micrometer of grain boundary length)".

Number Density of Oxide Particles Each Having Equivalent Circle Diameter of Greater Than 2 μm A central part of final pass of each of the above-obtained weld metals after the SR heat treatment at 705° C. for 8 hours was polished to a mirror-smooth state, and four images of an area of 0.037 μm$^2$ were taken at 1000-fold magnification. The sizes and number density of oxide particles in the taken images were analyzed using the image analyzing software ("Image-Pro Plus" supplied by Media Cybernetics, Inc.). Oxide particles each having an equivalent circle diameter of greater than 2 μm were selected, the numbers of the oxide particles per square millimeter were counted on each of the four images, and an arithmetic mean was calculated therefrom. All inclusions observed after polishing to a mirror-smooth state were determined as oxides.

Strength

Figure 3:
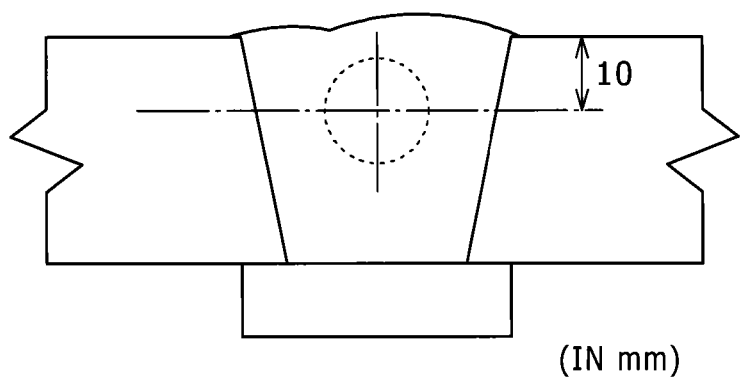
FIG. 3 is a schematic explanatory drawing illustrating where a tensile test specimen is sampled.

A tensile test specimen (JIS Z 3111 No. A2 specimen) was sampled from each of weld metals after an SR heat treatment at 705° C. for 32 hours. The tensile test specimen was sampled in the weld line direction at a position 10 mm deep from a surface in the thickness direction, as illustrated in FIG. 3. The test specimen was subjected to measurement of a tensile strength TS at room temperature (25° C.) according to the procedure as prescribed in JIS Z 2241.

A sample having a tensile strength TS of greater than 600 MPa was evaluated as excelling in strength.

Toughness

Figure 4:
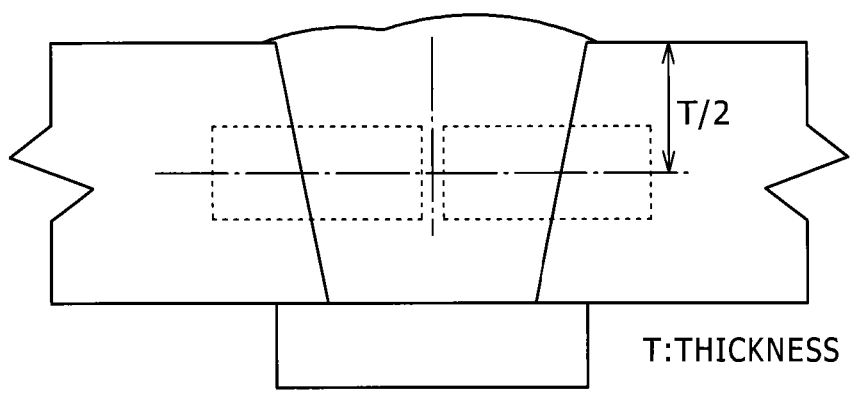
FIG. 4 is a schematic explanatory drawing illustrating where a Charpy impact test specimen is sampled.

A Charpy impact test specimen (JIS Z 3111 No. 4 V-notched specimen) was sampled from each of the above-prepared weld metals after the SR heat treatment at 705° C. for 8 hours. The test specimen was sampled from a thickness central part in a direction perpendicular to the weld line direction (welding direction), as illustrated in FIG. 4. The test specimen was subjected to a Charpy impact test three times by the procedure as specified in JIS Z 2242, and a temperature $vTr_{54}$ at which the average of three measurements of absorbed energy be 54 J was measured. A sample having a $vTr_{54}$ of −50° C. or lower was evaluated as having excellent toughness. Independently, each of the weld metals subjected to the step cooling after the SR heat treatment at 705° C. for 8 hours was subjected to a Charpy impact test by the same procedure as above, and a temperature $vTr'_{54}$ at which the average of three measurements of absorbed energy be 54 J was measured. A sample having a $vTr'_{54}$ of −50° C. or lower was evaluated as having excellent toughness.

Temper Embrittlement Resistance

A sample having a $vTr'_{54}$ and a $vTr_{54}$ as measured above with a difference $\Delta vTr_{54}$ between them of 5° C. or lower [$\Delta vTr_{54}=(vTr'_{54}-vTr_{54})\leq 5°$ C.] was evaluated as having excellent temper embrittlement resistance toughness. A sample weld metal having a $\Delta vTr_{54}$ of "0° C." was evaluated as excellent as suffering from substantially no temper embrittlement.

Stress-Relief Cracking Resistance

Ring crack specimens with a slit of 0.5 mm in size were sampled from a final pass (as welded zone) of each weld metal in the following manner. Specifically, three observation planes were observed as specimens, and two tests were performed per one weld metal sample. Namely, a total of six specimens was tested per one sample. Each sample was subjected to an SR heat treatment at 625° C. for 10 hours. A sample for which all the six specimens did not suffer from cracking in the vicinity of the notch bottom was evaluated as having good stress-relief cracking resistance (indicated by "○"); and a sample for which at least one of the six specimens suffered from the cracking was evaluated as having poor stress-relief cracking resistance (indicated by "×").

Figure 5A:
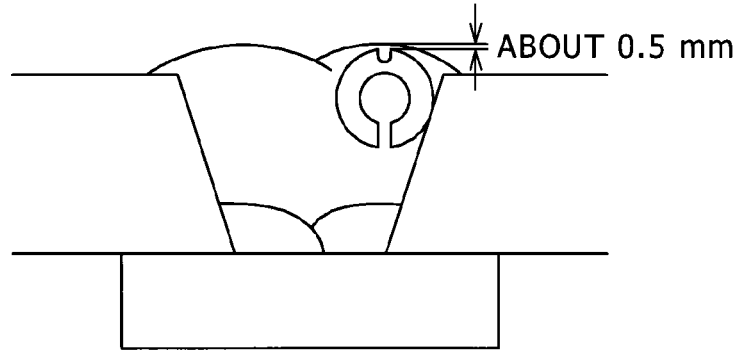
FIG. 5A is a schematic explanatory drawing illustrating where a stress-relief cracking resistance test specimen is sampled.
Figure 5B:
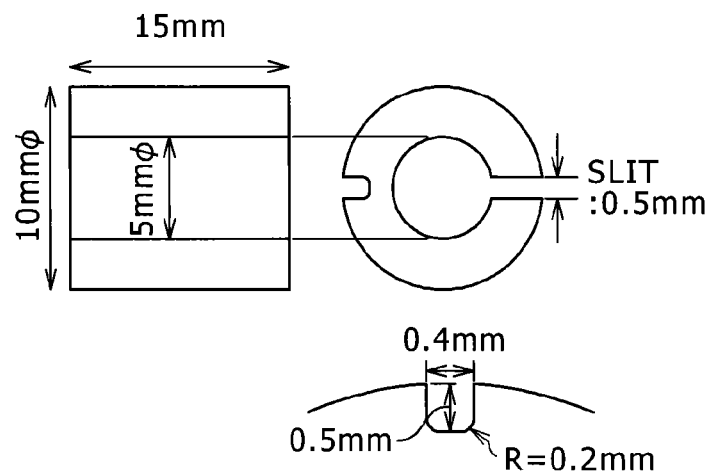
FIG. 5B is a schematic explanatory drawing illustrating dimensions of the stress-relief cracking resistance test specimen.
Figure 5C:
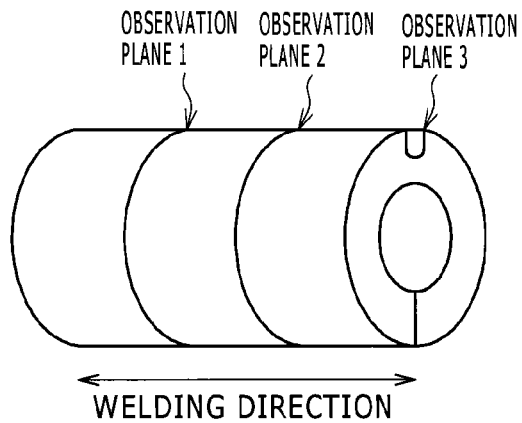
FIG. 5C is a schematic explanatory drawing illustrating how to sample the stress-relief cracking resistance test specimen.

The ring cracking tests to evaluate the stress-relief cracking resistance were performed approximately in a manner as follows. FIG. 5A illustrates where a specimen was sampled, and FIG. 5B illustrates which dimensions the specimen had. The specimen was sampled immediately below the surface of the final bead so that a microstructure immediately below the U-shaped notch be an as welded zone. The specimen had a slit size (width) of 0.5 mm. The specimen was pressed and narrowed to a slit width of 0.05 mm and TIG-welded at the slit to apply a tensile residual stress to the notch bottom. The specimen after TIG welding was subjected to an SR heat treatment in a muffle furnace at 625° C. for 10 hours, and the specimen after the SR heat treatment was divided in three equal parts (observation planes 1 to 3) as illustrated in FIG. 5C to sample three ring crack specimens. The ring crack specimens were observed on cross sections thereof (in the vicinity of the notch bottom) under an optical microscope to examine whether or not and how SR cracking occurred.

The chemical compositions of the coating fluxes used in the formation of the weld metals are indicated in Tables 1 to 3 (coating flux type B1 to B42 and BA to BG). The chemical compositions of the formed weld metals with the welding conditions (coating flux type, heat input condition, core wire type, and preheat-interpass temperature) and the A-value are indicated in Tables 4 to 6 (Tests Nos. 1 to 44 and A to G). Evaluation results of properties [number of grain boundary carbides, tensile strength TS, toughness ($vTr_{54}$ and $vTr'_{54}$), temper embrittlement resistance ($\Delta vTr_{54}$), and stress-relief cracking resistance] and the A-value of the weld metals are indicated in Tables 7 to 9 (Tests Nos. 1 to 44 and A to G). In addition, the number of oxide particles each having an equivalent circle diameter of greater than 2 μm is additionally indicated in Table 9. Tests Nos. 1 and 3 to 8 in Table 9 are the same as Tests Nos. 1 and 3 to 8 in Tables 4 and 7.

TABLE 1

| Coating flux number | Chemical composition of coating flux (percent by mass) | | | | | | | | | | | | | | | | | | | |
|---|---|---|---|---|---|---|---|---|---|---|---|---|---|---|---|---|---|---|---|---|
| | CaO | $CO_2$ | $CaF_2$ | C | Si | $SiO_2$ | Mn | Cr | Mo | V | Nb | Cu | Ni | B | W | Al | Ti | MgO | Si/$SiO_2$ | Others* |
| B1 | 23 | 22 | 21 | 0.085 | 3.4 | 2.9 | 2.6 | 0.2 | — | 1.12 | 0.108 | — | — | 0.03 | — | 0.1 | 0.004 | 1.95 | 1.2 | 21 |
| B2 | 23 | 22 | 21 | 0.085 | 3.7 | 2.9 | 2.8 | 0.4 | 0.05 | 1.27 | 0.195 | — | — | 0.03 | — | 0.1 | 0.004 | 1.95 | 1.3 | 20 |
| B3 | 23 | 22 | 21 | 0.085 | 3.7 | 2.7 | 2.7 | 0.4 | — | 1.27 | 0.122 | — | — | 0.03 | — | 0.1 | 0.004 | 1.95 | 1.4 | 20 |
| B4 | 23 | 22 | 21 | 0.080 | 3.2 | 2.9 | 2.6 | 0.7 | — | 1.12 | 0.220 | — | — | 0.03 | — | 0.1 | 0.004 | 1.95 | 1.1 | 21 |
| B5 | 23 | 22 | 21 | 0.080 | 3.4 | 2.6 | 2.6 | 0.1 | — | 1.27 | 0.108 | — | — | 0.05 | — | 0.1 | 0.004 | 1.95 | 1.3 | 21 |
| B6 | 23 | 22 | 21 | 0.080 | 3.7 | 2.9 | 2.5 | 0.4 | — | 1.27 | 0.122 | — | — | 0.06 | — | 0.1 | 0.004 | 1.95 | 1.3 | 20 |
| B7 | 23 | 22 | 21 | 0.155 | 3.7 | 2.9 | 2.5 | 1.4 | 0.10 | 1.40 | 0.108 | 0.2 | — | 0.03 | — | 0.1 | 0.004 | 1.95 | 1.3 | 19 |
| B8 | 23 | 22 | 21 | 0.075 | 3.4 | 2.9 | 2.7 | 0.2 | — | 1.27 | 0.195 | — | 0.3 | 0.03 | — | 0.1 | 0.004 | 1.95 | 1.2 | 20 |
| B9 | 23 | 22 | 21 | 0.080 | 3.4 | 2.9 | 2.7 | 0.4 | — | 1.27 | 0.108 | — | — | 0.03 | — | 0.1 | 0.004 | 1.95 | 1.2 | 21 |
| B10 | 23 | 22 | 21 | 0.080 | 2.8 | 2.3 | 2.6 | 1.4 | — | 1.12 | 0.108 | — | — | 0.06 | — | 0.1 | 0.004 | 1.95 | 1.2 | 21 |
| B11 | 23 | 22 | 21 | 0.080 | 4.0 | 2.9 | 2.1 | 2.2 | — | 1.40 | 0.108 | 0.1 | 0.6 | 0.05 | 0.7 | 0.1 | 0.004 | 1.95 | 1.4 | 17 |
| B12 | 23 | 22 | 21 | 0.080 | 4.0 | 2.7 | 3.0 | 0.4 | — | 1.12 | 0.220 | — | — | 0.03 | — | 0.1 | 0.080 | 1.95 | 1.5 | 20 |
| B13 | 23 | 22 | 21 | 0.135 | 3.3 | 2.7 | 2.6 | 1.5 | 1.11 | 0.81 | 0.195 | 0.6 | 0.3 | 0.05 | — | 0.1 | 0.004 | 1.95 | 1.2 | 18 |
| B14 | 23 | 22 | 21 | 0.175 | 3.7 | 2.9 | 2.5 | 1.5 | — | 1.27 | 0.146 | 0.3 | 0.3 | 0.03 | — | 0.1 | 0.060 | 1.95 | 1.3 | 19 |
| B15 | 23 | 22 | 21 | 0.085 | 3.7 | 2.9 | 2.8 | 0.3 | — | 1.45 | 0.108 | — | — | 0.05 | — | 0.1 | 0.004 | 1.95 | 1.3 | 20 |
| B16 | 23 | 22 | 21 | 0.085 | 3.7 | 2.9 | 2.7 | 2.2 | — | 1.40 | 0.108 | — | — | 0.15 | 0.7 | 0.8 | 0.004 | 1.95 | 1.3 | 17 |
| B17 | 23 | 22 | 21 | 0.085 | 3.1 | 2.9 | 3.0 | 1.4 | 0.20 | 1.40 | 0.098 | 1.1 | — | 0.05 | — | 0.1 | 0.030 | 1.95 | 1.1 | 18 |
| B18 | 23 | 22 | 21 | 0.085 | 3.7 | 2.6 | 2.6 | 0.7 | — | 1.27 | 0.098 | — | — | 0.13 | — | 0.1 | 0.004 | 1.95 | 1.4 | 20 |
| B19 | 23 | 22 | 21 | 0.085 | 4.0 | 3.3 | 2.6 | 0.2 | — | 1.27 | 0.288 | — | — | 0.03 | — | 0.1 | 0.004 | 1.95 | 1.2 | 20 |
| B20 | 23 | 22 | 21 | 0.085 | 3.4 | 2.9 | 2.6 | 0.4 | — | 1.00 | 0.220 | — | — | 0.03 | 0.3 | 0.1 | 0.060 | 1.95 | 1.2 | 20 |
| B21 | 23 | 22 | 21 | 0.155 | 3.7 | 2.9 | 2.5 | 0.1 | — | 1.00 | 0.108 | — | 1.0 | 0.11 | — | 0.6 | 0.004 | 1.95 | 1.3 | 19 |

*Others including SrO and $BaF_2$

TABLE 2

| Coating flux number | Chemical composition of coating flux (percent by mass) | | | | | | | | | | | | | | | | | | | |
|---|---|---|---|---|---|---|---|---|---|---|---|---|---|---|---|---|---|---|---|---|
| | CaO | $CO_2$ | $CaF_2$ | C | Si | $SiO_2$ | Mn | Cr | Mo | V | Nb | Cu | Ni | B | W | Al | Ti | MgO | Si/$SiO_2$ | Others* |
| B22 | 23 | 22 | 21 | 0.085 | 4.0 | 2.9 | 2.7 | 0.3 | — | 1.00 | 0.108 | — | — | 0.03 | 0.2 | 0.1 | 0.004 | 1.95 | 1.4 | 20 |
| B23 | 23 | 22 | 21 | 0.155 | 3.7 | 2.9 | 2.8 | 0.2 | — | 1.12 | 0.108 | — | — | 0.03 | 1.0 | 0.1 | 0.004 | 1.95 | 1.3 | 19 |
| B24 | 23 | 22 | 21 | 0.155 | 3.1 | 2.9 | 2.9 | 0.1 | 0.15 | 1.27 | 0.146 | — | — | 0.18 | — | 0.8 | 0.004 | 1.95 | 1.1 | 20 |
| B25 | 23 | 22 | 21 | 0.175 | 3.7 | 2.9 | 2.9 | 0.7 | 0.10 | 1.12 | 0.146 | — | — | 0.03 | — | 0.1 | 0.004 | 1.95 | 1.3 | 20 |
| B26 | 23 | 22 | 21 | 0.085 | 3.7 | 2.9 | 2.6 | 0.4 | — | 1.27 | 0.108 | — | — | 0.05 | — | 0.1 | 0.004 | 1.95 | 1.3 | 20 |
| B27 | 23 | 22 | 21 | 0.085 | 3.7 | 2.9 | 2.6 | 0.4 | — | 1.27 | 0.108 | — | — | 0.05 | — | 0.1 | 0.004 | 1.95 | 1.3 | 20 |
| B28 | 23 | 22 | 21 | 0.155 | 3.7 | 2.9 | 2.6 | 0.7 | 0.20 | 1.00 | 0.095 | — | — | 0.03 | — | 0.1 | 0.004 | 1.95 | 1.3 | 20 |
| B29 | 23 | 22 | 21 | 0.165 | 3.3 | 2.7 | 2.7 | 2.7 | 1.41 | 1.27 | 0.108 | — | — | 0.03 | — | 0.1 | 0.004 | 1.95 | 1.2 | 17 |
| B30 | 23 | 22 | 21 | 0.085 | 3.0 | 3.5 | 2.7 | 0.1 | — | 1.27 | 0.122 | — | — | 0.03 | — | 0.1 | 0.004 | 1.95 | 0.9 | 21 |
| B31 | 23 | 22 | 21 | 0.060 | 2.8 | 2.9 | 2.6 | 0.7 | — | 1.27 | 0.108 | — | — | 0.05 | — | 0.1 | 0.004 | 1.95 | 1.0 | 23 |
| B32 | 23 | 22 | 21 | 0.190 | 3.3 | 2.9 | 3.3 | 0.2 | 0.25 | 1.12 | 0.146 | — | — | 0.03 | — | 0.1 | 0.004 | 1.95 | 1.1 | 22 |
| B33 | 23 | 22 | 21 | 0.135 | 3.8 | 2.8 | 1.9 | 1.5 | 0.98 | 0.75 | 0.240 | — | — | 0.03 | — | 1.0 | 0.004 | 1.95 | 1.4 | 20 |
| B34 | 23 | 22 | 21 | 0.135 | 4.5 | 3.1 | 2.6 | 1.4 | 1.28 | 1.27 | 0.195 | — | — | 0.06 | — | 0.8 | 0.004 | 1.95 | 1.5 | 18 |
| B35 | 23 | 22 | 21 | 0.175 | 3.7 | 2.9 | 2.7 | 2.6 | — | 1.45 | 0.122 | — | — | 0.06 | — | 0.1 | 0.110 | 1.95 | 1.3 | 20 |
| B36 | 23 | 22 | 21 | 0.180 | 3.3 | 2.7 | 2.6 | 2.7 | 0.81 | 1.12 | 0.108 | 0.2 | — | 0.06 | 1.5 | 0.1 | 0.004 | 1.95 | 1.2 | 18 |
| B37 | 23 | 22 | 21 | 0.085 | 3.7 | 2.9 | 2.7 | 0.5 | — | 1.73 | 0.122 | 0.1 | 0.2 | 0.22 | — | 0.10 | 0.004 | 1.95 | 1.3 | 21 |
| B38 | 23 | 22 | 21 | 0.080 | 3.7 | 2.9 | 2.6 | 0.2 | — | 1.12 | 0.087 | — | — | 0.05 | — | 0.10 | 0.004 | 1.95 | 1.3 | 23 |
| B39 | 23 | 22 | 21 | 0.085 | 3.7 | 2.9 | 2.7 | 0.7 | — | 1.00 | 0.344 | 0.1 | — | 0.03 | — | 0.10 | 0.004 | 1.95 | 1.3 | 22 |

TABLE 2-continued

| Coating flux number | Chemical composition of coating flux (percent by mass) | | | | | | | | | | | | | | | | | | |
|---|---|---|---|---|---|---|---|---|---|---|---|---|---|---|---|---|---|---|---|
| | CaO | CO₂ | CaF₂ | C | Si | SiO₂ | Mn | Cr | Mo | V | Nb | Cu | Ni | B | W | Al | Ti | MgO | Si/SiO₂ | Others* |
| B40 | 23 | 22 | 21 | 0.085 | 3.7 | 2.9 | 2.7 | 0.2 | — | 1.27 | 0.108 | — | — | 0.03 | — | 0.10 | 0.004 | 1.95 | 1.3 | 22 |
| B41 | 23 | 22 | 21 | 0.080 | 3.7 | 2.6 | 2.8 | 0.1 | — | 1.27 | 0.122 | 1.2 | — | 0.11 | — | 0.10 | 0.004 | 1.95 | 1.4 | 21 |
| B42 | 23 | 22 | 21 | 0.085 | 3.4 | 2.9 | 2.7 | 0.4 | — | 1.32 | 0.195 | — | 1.2 | 0.03 | — | 0.10 | 0.004 | 1.95 | 1.2 | 21 |

*Others including SrO and BaF₂

TABLE 3

| Coating flux number | Chemical composition of coating flux (percent by mass) | | | | | | | | | | | | | | | | | | | |
|---|---|---|---|---|---|---|---|---|---|---|---|---|---|---|---|---|---|---|---|---|
| | CaO | CO₂ | CaF₂ | C | Si | SiO₂ | Mn | Cr | Mo | V | Nb | Cu | Ni | B | W | Al | Ti | MgO | Si/SiO₂ | Others* |
| BA | 23 | 22 | 21 | 0.085 | 3.4 | 2.9 | 2.6 | 0.2 | — | 1.10 | 0.105 | — | — | 0.03 | — | 0.1 | 0.004 | 2.30 | 1.2 | 21 |
| BB | 23 | 22 | 21 | 0.085 | 3.7 | 2.7 | 2.7 | 0.4 | — | 1.25 | 0.119 | — | — | 0.03 | — | 0.1 | 0.004 | 2.29 | 1.4 | 20 |
| BC | 23 | 22 | 21 | 0.080 | 3.2 | 2.9 | 2.6 | 0.7 | — | 1.10 | 0.218 | — | — | 0.03 | — | 0.1 | 0.004 | 2.30 | 1.1 | 20 |
| BD | 23 | 22 | 21 | 0.080 | 3.4 | 2.6 | 2.6 | 0.1 | — | 1.22 | 0.105 | — | — | 0.05 | — | 0.1 | 0.004 | 2.05 | 1.3 | 21 |
| BE | 23 | 22 | 21 | 0.080 | 3.8 | 2.9 | 2.5 | 0.4 | — | 1.24 | 0.118 | — | — | 0.06 | — | 0.1 | 0.004 | 2.18 | 1.3 | 20 |
| BF | 23 | 22 | 21 | 0.155 | 3.7 | 2.9 | 2.6 | 1.4 | 0.10 | 1.40 | 0.104 | 0.2 | — | 0.03 | — | 0.1 | 0.004 | 2.25 | 1.3 | 19 |
| BG | 23 | 22 | 21 | 0.075 | 3.4 | 2.9 | 2.7 | 0.2 | — | 1.25 | 0.190 | — | 0.3 | 0.03 | — | 0.1 | 0.004 | 2.28 | 1.2 | 20 |

*Others including SrO and BaF₂

TABLE 4

| Test number | Coating flux number | Heat input condition | Core wire type | Preheat-interpass temperature (° C.) | Chemical composition** of weld metal (percent by mass) | | | | | |
|---|---|---|---|---|---|---|---|---|---|---|
| | | | | | C | Si | Mn | Cr | Mo | V |
| 1 | B1 | i | a | 200 | 0.09 | 0.26 | 0.98 | 2.11 | 1.00 | 0.34 |
| 2 | B2 | i | a | 200 | 0.08 | 0.28 | 1.12 | 2.22 | 1.05 | 0.38 |
| 3 | B3 | i | a | 200 | 0.08 | 0.28 | 1.02 | 2.18 | 1.02 | 0.37 |
| 4 | B4 | ii | a | 210 | 0.07 | 0.22 | 0.91 | 2.33 | 0.98 | 0.32 |
| 5 | B5 | i | b | 230 | 0.08 | 0.28 | 0.93 | 1.94 | 1.05 | 0.36 |
| 6 | B6 | i | a | 200 | 0.07 | 0.27 | 0.89 | 2.21 | 1.02 | 0.38 |
| 7 | B7 | i | a | 190 | 0.10 | 0.31 | 0.87 | 2.42 | 1.08 | 0.42 |
| 8 | B8 | ii | b | 210 | 0.06 | 0.25 | 1.01 | 2.16 | 1.05 | 0.37 |
| 9 | B9 | i | b | 200 | 0.08 | 0.27 | 1.00 | 2.18 | 1.04 | 0.36 |
| 10 | B10 | i | a | 200 | 0.07 | 0.11 | 0.95 | 2.46 | 1.02 | 0.35 |
| 11 | B11 | iii | a | 210 | 0.07 | 0.33 | 0.68 | 2.77 | 1.03 | 0.44 |
| 12 | B12 | iii | b | 220 | 0.09 | 0.42 | 1.27 | 2.20 | 1.02 | 0.30 |
| 13 | B13 | i | c | 240 | 0.09 | 0.29 | 0.92 | 1.82 | 0.83 | 0.26 |
| 14 | B14 | ii | a | 210 | 0.14 | 0.28 | 0.90 | 2.51 | 1.02 | 0.38 |
| 15 | B15 | i | a | 200 | 0.09 | 0.28 | 1.05 | 2.16 | 1.02 | 0.46 |
| 16 | B16 | i | a | 210 | 0.08 | 0.29 | 0.97 | 2.83 | 1.02 | 0.41 |
| 17 | B17 | ii | a | 200 | 0.09 | 0.18 | 1.13 | 2.44 | 1.17 | 0.41 |
| 18 | B18 | iii | b | 210 | 0.10 | 0.29 | 0.98 | 2.38 | 1.05 | 0.35 |
| 19 | B19 | ii | a | 200 | 0.08 | 0.38 | 0.95 | 2.12 | 1.02 | 0.38 |
| 20 | B20 | ii | a | 200 | 0.07 | 0.27 | 0.94 | 2.20 | 0.99 | 0.32 |
| 21 | B21 | ii | a | 200 | 0.11 | 0.28 | 0.90 | 2.05 | 1.02 | 0.30 |
| 22 | B22 | ii | a | 200 | 0.09 | 0.35 | 1.00 | 2.16 | 1.04 | 0.30 |

| Test number | Chemical composition** of weld metal (percent by mass) | | | | | | | | | A-value |
|---|---|---|---|---|---|---|---|---|---|---|
| | Nb | N | O | Cu | Ni | B | W | Al | Ti | |
| 1 | 0.019 | 0.015 | 0.036 | <0.02 | <0.02 | <0.001 | <0.01 | <0.01 | <0.002 | 0.13 |
| 2 | 0.026 | 0.014 | 0.038 | <0.02 | <0.02 | <0.001 | <0.01 | <0.01 | <0.002 | 0.14 |
| 3 | 0.020 | 0.015 | 0.038 | 0.02 | <0.02 | <0.001 | <0.01 | <0.01 | <0.002 | 0.14 |
| 4 | 0.035 | 0.014 | 0.032 | 0.03 | 0.03 | <0.001 | <0.01 | <0.01 | <0.002 | 0.12 |
| 5 | 0.021 | 0.013 | 0.033 | 0.03 | 0.03 | 0.0011 | <0.01 | <0.01 | <0.002 | 0.15 |
| 6 | 0.020 | 0.013 | 0.034 | 0.04 | 0.04 | 0.0018 | <0.01 | <0.01 | <0.002 | 0.14 |
| 7 | 0.019 | 0.013 | 0.033 | 0.15 | 0.03 | <0.001 | <0.01 | <0.01 | <0.002 | 0.15 |
| 8 | 0.026 | 0.016 | 0.041 | 0.03 | 0.21 | <0.001 | <0.01 | <0.01 | <0.002 | 0.14 |
| 9 | 0.018 | 0.015 | 0.036 | 0.05 | 0.04 | <0.001 | <0.01 | <0.01 | <0.002 | 0.14 |
| 10 | 0.018 | 0.014 | 0.052 | 0.03 | 0.03 | 0.0015 | <0.01 | <0.01 | <0.002 | 0.12 |
| 11 | 0.018 | 0.011 | 0.033 | 0.07 | 0.53 | 0.0013 | 0.23 | <0.01 | <0.002 | 0.14 |
| 12 | 0.033 | 0.012 | 0.022 | 0.04 | 0.05 | <0.001 | <0.01 | <0.01 | 0.017 | 0.12 |
| 13 | 0.025 | 0.012 | 0.038 | 0.44 | 0.18 | 0.0013 | <0.01 | <0.01 | <0.002 | 0.12 |
| 14 | 0.022 | 0.013 | 0.028 | 0.26 | 0.30 | <0.001 | <0.01 | <0.01 | 0.009 | 0.13 |
| 15 | 0.018 | 0.011 | 0.033 | 0.03 | 0.04 | 0.0012 | <0.01 | <0.01 | <0.002 | 0.18 |

TABLE 4-continued

| | | | | | | | | | | |
|---|---|---|---|---|---|---|---|---|---|---|
| 16 | 0.018 | 0.014 | 0.031 | 0.02 | 0.05 | 0.0035 | 0.026 | 0.022 | <0.002 | 0.13 |
| 17 | 0.010 | 0.013 | 0.035 | 0.92 | 0.04 | 0.0013 | <0.01 | <0.01 | 0.005 | 0.14 |
| 18 | 0.012 | 0.013 | 0.033 | 0.03 | 0.04 | 0.0026 | <0.01 | <0.01 | <0.002 | 0.12 |
| 19 | 0.043 | 0.013 | 0.034 | 0.04 | <0.02 | <0.001 | <0.01 | <0.01 | <0.002 | 0.15 |
| 20 | 0.035 | 0.023 | 0.037 | 0.03 | 0.03 | <0.001 | 0.11 | <0.01 | 0.011 | 0.13 |
| 21 | 0.018 | 0.015 | 0.030 | <0.02 | 0.88 | 0.0022 | <0.01 | 0.018 | <0.002 | 0.12 |
| 22 | 0.018 | 0.011 | 0.032 | <0.02 | 0.03 | <0.001 | 0.05 | <0.01 | <0.002 | 0.12 |

**with the remainder being iron and inevitable impurities

TABLE 5

| Test number | Coating flux number | Heat input condition | Core wire type | Preheat-interpass temperature (° C.) | Chemical composition** of weld metal (percent by mass) | | | | | |
|---|---|---|---|---|---|---|---|---|---|---|
| | | | | | C | Si | Mn | Cr | Mo | V |
| 23 | B23 | ii | a | 200 | 0.12 | 0.30 | 1.07 | 2.06 | 0.94 | 0.35 |
| 24 | B24 | ii | a | 200 | 0.11 | 0.21 | 1.13 | 2.02 | 1.12 | 0.36 |
| 25 | B25 | i | a | 230 | 0.13 | 0.31 | 1.18 | 2.30 | 1.07 | 0.33 |
| 26 | B1 | iv | a | 200 | 0.09 | 0.27 | 0.96 | 2.10 | 1.01 | 0.34 |
| 27 | B1 | i | a | 260 | 0.09 | 0.26 | 0.96 | 2.09 | 0.98 | 0.33 |
| 28 | B26 | i | d | 200 | 0.08 | 0.33 | 0.96 | 2.25 | 1.02 | 0.38 |
| 29 | B27 | ii | e | 200 | 0.08 | 0.28 | 0.96 | 2.26 | 1.12 | 0.40 |
| 30 | B28 | i | a | 210 | 0.11 | 0.28 | 0.97 | 2.35 | 1.15 | 0.31 |
| 31 | B29 | i | c | 200 | 0.10 | 0.29 | 1.03 | 2.21 | 1.04 | 0.38 |
| 32 | B30 | i | a | 200 | 0.08 | 0.28 | 0.99 | 2.05 | 1.02 | 0.38 |
| 33 | B31 | i | a | 210 | 0.04 | 0.14 | 0.94 | 2.33 | 1.03 | 0.37 |
| 34 | B32 | ii | a | 200 | 0.16 | 0.24 | 1.31 | 2.10 | 1.22 | 0.33 |
| 35 | B33 | i | c | 220 | 0.09 | 0.38 | 0.57 | 1.81 | 0.85 | 0.24 |
| 36 | B34 | i | c | 200 | 0.08 | 0.53 | 0.92 | 1.76 | 1.02 | 0.36 |
| 37 | B35 | iii | a | 200 | 0.13 | 0.29 | 0.95 | 3.05 | 1.03 | 0.45 |
| 38 | B36 | i | c | 210 | 0.11 | 0.28 | 0.95 | 2.19 | 0.77 | 0.33 |
| 39 | B37 | ii | a | 230 | 0.08 | 0.28 | 0.97 | 2.28 | 1.04 | 0.52 |
| 40 | B38 | i | b | 200 | 0.07 | 0.29 | 0.95 | 2.16 | 1.03 | 0.33 |
| 41 | B39 | iii | a | 200 | 0.09 | 0.29 | 0.96 | 2.30 | 1.02 | 0.31 |
| 42 | B40 | i | a | 200 | 0.07 | 0.28 | 0.96 | 2.11 | 1.02 | 0.37 |
| 43 | B41 | i | b | 200 | 0.08 | 0.28 | 1.11 | 1.99 | 1.02 | 0.36 |
| 44 | B42 | i | a | 200 | 0.08 | 0.26 | 1.06 | 2.18 | 1.02 | 0.41 |

| Test number | Chemical composition** of weld metal (percent by mass) | | | | | | | | | |
|---|---|---|---|---|---|---|---|---|---|---|
| | Nb | N | O | Cu | Ni | B | W | Al | Ti | A-value |
| 23 | 0.017 | 0.022 | 0.043 | 0.03 | <0.02 | <0.001 | 0.32 | <0.01 | <0.002 | 0.14 |
| 24 | 0.022 | 0.014 | 0.028 | 0.03 | 0.03 | 0.0046 | <0.01 | 0.025 | <0.002 | 0.14 |
| 25 | 0.025 | 0.012 | 0.039 | 0.04 | 0.04 | <0.001 | <0.01 | <0.01 | <0.002 | 0.12 |
| 26 | 0.019 | 0.012 | 0.034 | <0.02 | <0.02 | <0.001 | <0.01 | <0.01 | <0.002 | 0.13 |
| 27 | 0.020 | 0.012 | 0.033 | <0.02 | <0.02 | <0.001 | <0.01 | <0.01 | <0.002 | 0.13 |
| 28 | 0.015 | 0.013 | 0.035 | 0.02 | 0.03 | 0.0011 | <0.01 | <0.01 | <0.002 | 0.14 |
| 29 | 0.018 | 0.013 | 0.037 | 0.04 | 0.03 | 0.0013 | <0.01 | <0.01 | <0.002 | 0.15 |
| 30 | 0.013 | 0.013 | 0.035 | 0.03 | 0.04 | <0.001 | <0.01 | <0.01 | <0.002 | 0.11 |
| 31 | 0.022 | 0.015 | 0.036 | 0.04 | 0.04 | <0.001 | <0.01 | <0.01 | <0.002 | 0.14 |
| 32 | 0.020 | 0.014 | 0.042 | 0.04 | 0.04 | <0.001 | <0.01 | <0.01 | <0.002 | 0.15 |
| 33 | 0.019 | 0.014 | 0.061 | 0.03 | 0.03 | 0.0011 | <0.01 | <0.01 | <0.002 | 0.13 |
| 34 | 0.023 | 0.014 | 0.037 | 0.03 | 0.04 | <0.001 | <0.01 | <0.01 | <0.002 | 0.13 |
| 35 | 0.038 | 0.012 | 0.022 | 0.03 | 0.03 | <0.001 | <0.01 | 0.033 | <0.002 | 0.12 |
| 36 | 0.025 | 0.011 | 0.019 | 0.02 | 0.04 | 0.0015 | <0.01 | 0.028 | <0.002 | 0.16 |
| 37 | 0.021 | 0.016 | 0.031 | 0.03 | 0.05 | 0.0014 | 0.53 | <0.01 | 0.022 | 0.13 |
| 38 | 0.020 | 0.015 | 0.033 | 0.15 | 0.03 | 0.0015 | <0.01 | <0.01 | <0.002 | 0.13 |
| 39 | 0.020 | 0.014 | 0.034 | 0.05 | 0.15 | 0.0053 | <0.01 | <0.01 | <0.002 | 0.19 |
| 40 | 0.008 | 0.015 | 0.037 | 0.04 | 0.04 | 0.0013 | <0.01 | <0.01 | <0.002 | 0.13 |
| 41 | 0.053 | 0.016 | 0.032 | 0.11 | 0.04 | <0.001 | <0.01 | <0.01 | <0.002 | 0.12 |
| 42 | 0.019 | 0.026 | 0.029 | 0.03 | 0.05 | <0.001 | <0.01 | <0.01 | <0.002 | 0.15 |
| 43 | 0.022 | 0.013 | 0.033 | 1.05 | 0.05 | 0.0020 | <0.01 | <0.01 | <0.002 | 0.15 |
| 44 | 0.027 | 0.015 | 0.035 | 0.02 | 1.08 | <0.001 | <0.01 | <0.01 | <0.002 | 0.16 |

**with the remainder being iron and inevitable impurities

TABLE 6

| Test number | Coating flux number | Heat input condition | Core wire type | Preheat-interpass temperature (° C.) | Chemical composition** of weld metal (percent by mass) | | | | | |
|---|---|---|---|---|---|---|---|---|---|---|
| | | | | | C | Si | Mn | Cr | Mo | V |
| A | BA | i | a | 220 | 0.09 | 0.26 | 1.01 | 2.12 | 1.00 | 0.34 |
| B | BB | i | a | 220 | 0.07 | 0.27 | 1.03 | 2.20 | 1.01 | 0.37 |
| C | BC | i | a | 220 | 0.07 | 0.22 | 0.92 | 2.31 | 0.99 | 0.33 |
| D | BD | i | b | 220 | 0.08 | 0.29 | 0.95 | 1.96 | 1.04 | 0.36 |
| E | BE | i | a | 220 | 0.07 | 0.27 | 0.88 | 2.20 | 1.04 | 0.38 |
| F | BF | i | a | 220 | 0.11 | 0.30 | 0.87 | 2.40 | 1.05 | 0.42 |
| G | BG | i | b | 220 | 0.06 | 0.25 | 0.99 | 2.15 | 1.03 | 0.38 |

| Test number | Chemical composition** of weld metal (percent by mass) | | | | | | | | | A-value |
|---|---|---|---|---|---|---|---|---|---|---|
| | Nb | N | O | Cu | Ni | B | W | Al | Ti | |
| A | 0.020 | 0.016 | 0.038 | <0.02 | <0.02 | <0.001 | <0.01 | <0.01 | <0.002 | 0.13 |
| B | 0.020 | 0.015 | 0.037 | 0.03 | <0.02 | <0.001 | <0.01 | <0.01 | <0.002 | 0.14 |
| C | 0.034 | 0.015 | 0.033 | 0.03 | <0.02 | <0.001 | <0.01 | <0.01 | <0.002 | 0.12 |
| D | 0.019 | 0.014 | 0.033 | <0.02 | 0.03 | 0.0011 | <0.01 | <0.01 | <0.002 | 0.15 |
| E | 0.020 | 0.014 | 0.036 | 0.04 | 0.03 | 0.0018 | <0.01 | <0.01 | <0.002 | 0.14 |
| F | 0.020 | 0.013 | 0.035 | 0.16 | 0.03 | <0.001 | <0.01 | <0.01 | <0.002 | 0.15 |
| G | 0.028 | 0.016 | 0.042 | 0.03 | 0.21 | <0.001 | <0.01 | <0.01 | <0.002 | 0.15 |

**with the remainder being iron and inevitable impurities

TABLE 7

| Test number | A-value | Number of grain boundary carbides (number per micrometer) | TS (MPa) | vTr$_{54}$ (° C.) | vTr'$_{54}$ (° C.) | ΔvTr$_{54}$ (° C.) | SR cracking resistance |
|---|---|---|---|---|---|---|---|
| 1 | 0.13 | 0.21 | 651 | −54 | −52 | 2 | ○ |
| 2 | 0.14 | 0.20 | 657 | −55 | −53 | 2 | ○ |
| 3 | 0.14 | 0.21 | 645 | −56 | −54 | 2 | ○ |
| 4 | 0.12 | 0.24 | 639 | −54 | −50 | 4 | ○ |
| 5 | 0.15 | 0.19 | 645 | −55 | −54 | 1 | ○ |
| 6 | 0.14 | 0.18 | 643 | −56 | −55 | 1 | ○ |
| 7 | 0.15 | 0.22 | 658 | −53 | −51 | 2 | ○ |
| 8 | 0.14 | 0.15 | 618 | −57 | −57 | 0 | ○ |
| 9 | 0.14 | 0.17 | 632 | −56 | −55 | 1 | ○ |
| 10 | 0.12 | 0.24 | 615 | −53 | −50 | 3 | ○ |
| 11 | 0.14 | 0.23 | 617 | −54 | −52 | 2 | ○ |
| 12 | 0.12 | 0.24 | 698 | −53 | −50 | 3 | ○ |
| 13 | 0.12 | 0.25 | 605 | −55 | −50 | 5 | ○ |
| 14 | 0.13 | 0.24 | 699 | −53 | −50 | 3 | ○ |
| 15 | 0.18 | 0.13 | 667 | −55 | −55 | 0 | ○ |
| 16 | 0.13 | 0.24 | 663 | −54 | −50 | 4 | ○ |
| 17 | 0.14 | 0.24 | 681 | −53 | −50 | 3 | ○ |
| 18 | 0.12 | 0.24 | 663 | −54 | −50 | 4 | ○ |
| 19 | 0.15 | 0.12 | 658 | −56 | −55 | 1 | ○ |
| 20 | 0.13 | 0.15 | 641 | −54 | −54 | 0 | ○ |
| 21 | 0.12 | 0.24 | 671 | −54 | −50 | 4 | ○ |
| 22 | 0.12 | 0.24 | 640 | −53 | −50 | 3 | ○ |

TABLE 8

| Test number | A-value | Number of grain boundary carbides (number per micrometer) | TS (MPa) | vTr$_{54}$ (° C.) | vTr'$_{54}$ (° C.) | ΔvTr$_{54}$ (° C.) | SR cracking resistance |
|---|---|---|---|---|---|---|---|
| 23 | 0.14 | 0.22 | 685 | −53 | −51 | 2 | ○ |
| 24 | 0.14 | 0.24 | 678 | −54 | −50 | 4 | ○ |
| 25 | 0.12 | 0.24 | 681 | −53 | −50 | 3 | ○ |
| 26 | 0.13 | 0.27 | 636 | −46 | −40 | 6 | ○ |
| 27 | 0.13 | 0.28 | 641 | −45 | −38 | 7 | ○ |
| 28 | 0.14 | 0.26 | 635 | −43 | −36 | 7 | ○ |
| 29 | 0.15 | 0.27 | 640 | −49 | −43 | 6 | ○ |
| 30 | 0.11 | 0.27 | 659 | −44 | −35 | 9 | ○ |
| 31 | 0.14 | 0.33 | 650 | −42 | −36 | 6 | ○ |
| 32 | 0.15 | 0.28 | 634 | −43 | −35 | 8 | ○ |
| 33 | 0.13 | 0.24 | 593 | −40 | −36 | 4 | ○ |
| 34 | 0.13 | 0.24 | 734 | −43 | −37 | 6 | ○ |
| 35 | 0.12 | 0.24 | 588 | −35 | −31 | 4 | X |
| 36 | 0.16 | 0.29 | 702 | −42 | −35 | 7 | X |

TABLE 8-continued

| Test number | A-value | Number of grain boundary carbides (number per micrometer) | TS (MPa) | $vTr_{54}$ (° C.) | $vTr'_{54}$ (° C.) | $\Delta vTr_{54}$ (° C.) | SR cracking resistance |
|---|---|---|---|---|---|---|---|
| 37 | 0.13 | 0.28 | 722 | −38 | −32 | 6 | X |
| 38 | 0.13 | 0.20 | 595 | −56 | −54 | 2 | ○ |
| 39 | 0.19 | 0.12 | 721 | −48 | −42 | 6 | X |
| 40 | 0.13 | 0.25 | 588 | −54 | −50 | 4 | ○ |
| 41 | 0.12 | 0.21 | 709 | −45 | −40 | 5 | ○ |
| 42 | 0.15 | 0.20 | 696 | −41 | −37 | 4 | ○ |
| 43 | 0.15 | 0.21 | 635 | −45 | −41 | 4 | ○ |
| 44 | 0.16 | 0.20 | 705 | −46 | −41 | 5 | ○ |

TABLE 9

| Test number | A-value | Number of grain boundary carbides (number per micrometer) | Number density of oxide particles with circle equivalent diameter of greater than 2 μm (number per square millimeter) | TS (MPa) | $vTr_{54}$ (° C.) | $vTr'_{54}$ (° C.) | $\Delta vTr_{54}$ (° C.) | SR cracking resistance |
|---|---|---|---|---|---|---|---|---|
| 1 | 0.13 | 0.21 | 115 | 651 | −54 | −52 | 2 | ○ |
| 3 | 0.14 | 0.21 | 128 | 645 | −56 | −54 | 2 | ○ |
| 4 | 0.12 | 0.24 | 108 | 639 | −54 | −50 | 4 | ○ |
| 5 | 0.15 | 0.19 | 115 | 645 | −55 | −54 | 1 | ○ |
| 6 | 0.14 | 0.18 | 122 | 643 | −56 | −55 | 1 | ○ |
| 7 | 0.15 | 0.22 | 122 | 658 | −53 | −51 | 2 | ○ |
| 8 | 0.14 | 0.15 | 142 | 618 | −57 | −57 | 0 | ○ |
| A | 0.13 | 0.20 | 27 | 650 | −63 | −60 | 3 | ○ |
| B | 0.14 | 0.20 | 27 | 652 | −64 | −62 | 2 | ○ |
| C | 0.12 | 0.24 | 0 | 645 | −65 | −60 | 5 | ○ |
| D | 0.15 | 0.20 | 88 | 642 | −61 | −58 | 3 | ○ |
| E | 0.14 | 0.16 | 54 | 648 | −62 | −60 | 2 | ○ |
| F | 0.15 | 0.23 | 7 | 661 | −63 | −59 | 4 | ○ |
| G | 0.15 | 0.16 | 47 | 619 | −64 | −61 | 3 | ○ |

Tables 1 to 9 provide considerations as follows. Numbers below are Test Numbers given in Tables 4 to 9. Samples of Nos. 1 to 25 satisfied conditions specified in the present invention and gave weld metals that exhibited superior temper embrittlement resistance ($\Delta vTr_{54}$) and excelled in properties such as toughness, stress-relief cracking resistance, and strength.

In contrast, samples of Nos. 26 to 44 failed to satisfy one or more of the conditions specified in the present invention and gave weld metals that were inferior in one or more of the properties. Among them, the sample of No. 26 underwent welding with a high heat input (heat input of 3.2 kJ/mm) and thereby gave a weld metal including grain boundary carbides in a larger number and suffering from inferior toughness ($vTr_{54}$ and $vTr'_{54}$) and poor temper embrittlement resistance ($\Delta vTr_{54}$). The sample of No. 27 underwent welding at a preheat-interpass temperature higher than the suitable range and thereby gave a weld metal including grain boundary carbides in a larger number and suffering from inferior toughness ($vTr_{54}$ and $vTr'_{54}$) and poor temper embrittlement resistance ($\Delta vTr_{54}$).

The samples of Nos. 28 and 29 employed core wires having unsuitable chemical compositions, i.e., Chemical Compositions d and e, respectively and thereby gave a weld metal including grain boundary carbides in a larger number and suffering from inferior toughness ($vTr_{54}$ and $vTr'_{54}$) and poor temper embrittlement resistance ($\Delta vTr_{54}$). The sample of No. 30 gave a weld metal having an excessively low A-value, thereby including grain boundary carbides in a larger number, and suffering from inferior toughness ($vTr_{54}$ and $vTr'_{54}$) and poor temper embrittlement resistance ($\Delta vTr_{54}$).

The sample of No. 31 employed a coating flux having an excessively high Mo content and thereby gave a weld metal including grain boundary carbides in a larger number and suffering from inferior toughness ($vTr_{54}$ and $vTr'_{54}$) and poor temper embrittlement resistance ($\Delta vTr54$). The sample of No. 32 employed Coating Flux B30 having a ratio $Si/SiO_2$ at an unsuitable level and thereby gave a weld metal including grain boundary carbides in a larger number and suffering from inferior toughness ($vTr_{54}$ and $vTr'_{54}$) and poor temper embrittlement resistance ($\Delta vTr_{54}$).

The sample of No. 33 gave a weld metal having an insufficient C content and an excessively high O content and thereby suffering from an insufficient strength and inferior toughness ($vTr_{54}$ and $vTr'_{54}$). The sample of No. 34 gave a weld metal having excessively high C, Mn, and Mo contents and suffering from inferior toughness ($vTr_{54}$ and $vTr'_{54}$) and poor temper embrittlement resistance ($\Delta vTr_{54}$).

The sample of No. 35 gave a weld metal having insufficient Mn and V contents and an excessively high Al content and thereby suffering from an insufficient strength, inferior toughness ($vTr_{54}$ and $vTr'_{54}$), and poor stress-relief cracking resistance. The sample of No. 36 employed a coating flux having an excessively high Mo content and gave a weld metal having insufficient Cr and O contents and an excessively high Si content, thereby including grain boundary carbides in a larger number, and suffering from deterioration in all of toughness ($vTr_{54}$ and $vTr'_{54}$), temper embrittlement resistance ($\Delta vTr_{54}$), and stress-relief cracking resistance.

The sample of No. 37 gave a weld metal having excessively high Cr, W, and Ti contents, thereby including grain boundary carbides in a larger number, and suffering from deterioration in all of toughness (vTr$_{54}$ and vTr'$_{54}$), temper embrittlement resistance (ΔvTr$_{54}$), and stress-relief cracking resistance. The sample of No. 38 gave a weld metal having an insufficient Mo content and suffering from an insufficient strength.

The sample of No. 39 gave a weld metal having excessively high V and B contents and suffering from deterioration in all of toughness (vTr$_{54}$ and vTr'$_{54}$), temper embrittlement resistance (ΔvTr$_{54}$), and stress-relief cracking resistance. The sample of No. 40 gave a weld metal having an insufficient Nb content and suffering from an insufficient strength.

The sample of No. 41 gave a weld metal having an excessively high Nb content and suffering from inferior toughness (vTr$_{54}$ and vTr'$_{54}$). The sample of No. 42 gave a weld metal having an excessively high N content and suffering from inferior toughness (vTr$_{54}$ and vTr'$_{54}$).

The sample of No. 43 gave a weld metal having an excessively high Cu content and suffering from inferior toughness (vTr$_{54}$ and vTr'$_{54}$). The sample of No. 44 gave a weld metal having an excessively high Ni content and suffering from inferior toughness (vTr$_{54}$ and vTr'$_{54}$).

As indicated in Table 9, Tests Nos. 1 and 3 to 8 were samples not satisfying the condition in oxide particles, a preferred condition specified in the present invention; whereas Tests Nos. A to G were samples satisfying the condition in oxide particles. A comparison between these samples demonstrates that suppression of coarse oxide particles contributed both to better toughness after the SR heat treatment and better toughness after the step cooling.

While the present invention has been particularly described with reference to preferred embodiments thereof it will be understood by those skilled in the art that various changes and modifications may be made without departing from the spirit and scope of the invention.

The present application is based on Japanese Patent Application No. 2011-254318 filed on Nov. 21, 2011 and Japanese Patent Application No. 2012-37810 filed on Feb. 23, 2012, the entire contents of which are incorporated herein by reference.

INDUSTRIAL APPLICABILITY

The weld metals according to the present invention are suitable for use in steam boilers and chemical reactors.

The invention claimed is:

1. A weld metal, comprising: in percent by mass,
C in a content of 0.05% to 0.15%;
Si in a content of 0.1% to 0.50%;
Mn in a content of 0.60% to 1.30%;
Cr in a content of 1.80% to 3.0%;
Mo in a content of 0.80% to 1.20%;
V in a content of 0.25% to 0.50%;
Nb in a content of 0.010% to 0.050%;
N in a content of greater than 0% to 0.025%;
O in a content of 0.020% to 0.060%, and;
wherein
the weld metal comprises carbide particles each having an equivalent circle diameter of greater than 0.5 μm in a number of 0.25 or less per micrometer of grain boundary length; and
the weld metal has an A-value as specified by Formula (1) of 0.12 or more;

$$\text{A-value} = ([V]/51 + [Nb]/93)/([Cr]/52 + [Mo]/96) \qquad (1)$$

where [V], [Nb], [Cr], and [Mo] are contents, in percent by mass, of V, Nb, Cr, and Mo, respectively, in the weld metal.

2. The weld metal of claim 1, having a number density of oxide particles each having an equivalent circle diameter of greater than 2 μm of 100 or less per square millimeter.

3. The weld metal of claim 1, further comprising:
at least one element selected from the group consisting of:
Cu in a content of greater than 0% to 1.0%;
Ni in a content of greater than 0% to 1.0%;
B in a content of greater than 0% to 0.0050%;
W in a content of greater than 0% to 0.50%;
Al in a content of greater than 0% to 0.030%; and
Ti in a content of greater than 0% to 0.020%.

4. A welded structure, comprising the weld metal of claim 1.

5. A welded structure, comprising the weld metal of claim 2.

6. A welded structure, comprising the weld metal of claim 3.

7. The weld metal of claim 1, wherein the A-value is 0.13 or more.

8. The weld metal of claim 1, wherein the A-value is 0.20 or less.

9. The weld metal of claim 1, obtained by a shielded metal arc welding performed with a heat input of from 2.3 kJ/mm to 3.0 kJ/mm and at a preheat-interpass temperature of from 190° C. to 250° C.

10. The weld metal of claim 9, wherein a core wire comprising Mo in a content of 1.20 mass% or less and Cr in a content of 2.30 mass% or less is used in the shielded metal arc welding.

11. The weld metal of claim 9, wherein a coating flux comprising Mo in a content of 1.2 mass% or less and having a Si/SiO$_2$ ratio of 1.0 or more is used in the shielded metal arc welding.

12. The weld metal of claim 11, wherein the coating flux comprises MgO in a content of 2.0 mass% or more.

* * * * *